United States Patent
Boehland

[19]

[11] Patent Number: 5,810,328

[45] Date of Patent: Sep. 22, 1998

[54] ELECTRICALLY CONTROLLED VALVE

[75] Inventor: Peter Boehland, Steinheim, Germany

[73] Assignee: Robert Bosch GmbH, Stuttgart, Germany

[21] Appl. No.: 962,765

[22] Filed: Nov. 3, 1997

[30] Foreign Application Priority Data

Nov. 4, 1996 [DE] Germany .................. 196 45 308.9

[51] Int. Cl.⁶ .................................................. F16K 47/00
[52] U.S. Cl. .................. 251/118; 251/129.02; 251/24; 123/458
[58] Field of Search .................. 251/118, 129.02, 251/24; 137/469; 123/458

[56] References Cited

U.S. PATENT DOCUMENTS

| 1,419,290 | 6/1922 | Monahan | 251/116 |
| 4,832,312 | 5/1989 | Linder et al. | 123/458 |
| 5,239,968 | 8/1993 | Rodriguez-Amaya et al. | 123/458 |
| 5,347,970 | 9/1994 | Pape et al. | 123/458 |

FOREIGN PATENT DOCUMENTS

| 63-259282 (A) | 10/1988 | Japan | 251/118 |
| WO 83/03655 | 10/1983 | WIPO | 251/118 |

Primary Examiner—Denise L. Ferensic
Assistant Examiner—John Ball
Attorney, Agent, or Firm—Edwin E. Greigg; Ronald E. Greigg

[57] ABSTRACT

An electrically controlled valve which is used for controlling the opening area of a connection between a high pressure chamber and a low pressure chamber. The valve is embodied as a solenoid valve and has a valve seat on which a deflection point is provided downstream of a downstream edge of the valve member in the through flow direction. By means of a flow deflection, the fluid passing through is conveyed against an annular face provided on a valve member. The resulting pressure accelerates the opening of the valve. The solenoid valve is designated for use in fuel injection pumps in motor vehicles.

1 Claim, 2 Drawing Sheets

ELECTRICALLY CONTROLLED VALVE

BACKGROUND OF THE INVENTION

The invention relates to an electrically controlled valve for fuel injection pumps of motor vehicles.

In a known solenoid valve (EP 0 309 797 B1) which, for controlling the opening area of a connection between a high pressure chamber and a low pressure chamber, has a valve member that is moved by an electromagnet counter to the force of a restoring spring and this valve member is axially guided in a guide bore of the valve housing, the through flow cross section is constituted by the lifting of a conical face, which is disposed on the valve member, up from a conical valve seat in the valve housing, wherein above and below the valve seat, an annular chamber is incorporated into the valve housing into which the high pressure line or the low pressure line respectively feeds. The valve member in the form of a hollow cylinder is connected via a tappet to an armature which is acted upon by the electromagnet. The closing of the through flow cross section between the high and low pressure chamber is carried out when a sealing edge on the valve member, which edge is constituted by the transition of the conical face into the cylindrical jacket face, is set upon the face of the conical valve seat, wherein the through flow cross section between the conical face of the valve member and the valve seat is embodied so that already at the beginning of the opening stroke, as large an opening cross section as possible can be rapidly opened, which steadily grows as the opening stroke progresses further.

The through flow cross section of the known valve has the disadvantage that at the sealing edge and in the through flow cross section between the conical face of the valve member and the valve seat, due to the high flow velocities, the pressure of the fluid falls below the vapor pressure and vapor bubbles or cavities are produced. The valve opens in a delayed fashion due to the pressure drop.

OBJECT AND SUMMARY OF THE INVENTION

The solenoid valve according to the invention has the advantage over the prior art that through the disposition of a deflection point downstream of the sealing edge, throttling, is which can lead to problems in the filling and/or to an undesirable aspiration of the valve needle, does not occur.

The ram pressure on the needle produced by the deflection point considerably increases the force opening the valve so that a rapid and reproducible opening of the valve is assured.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
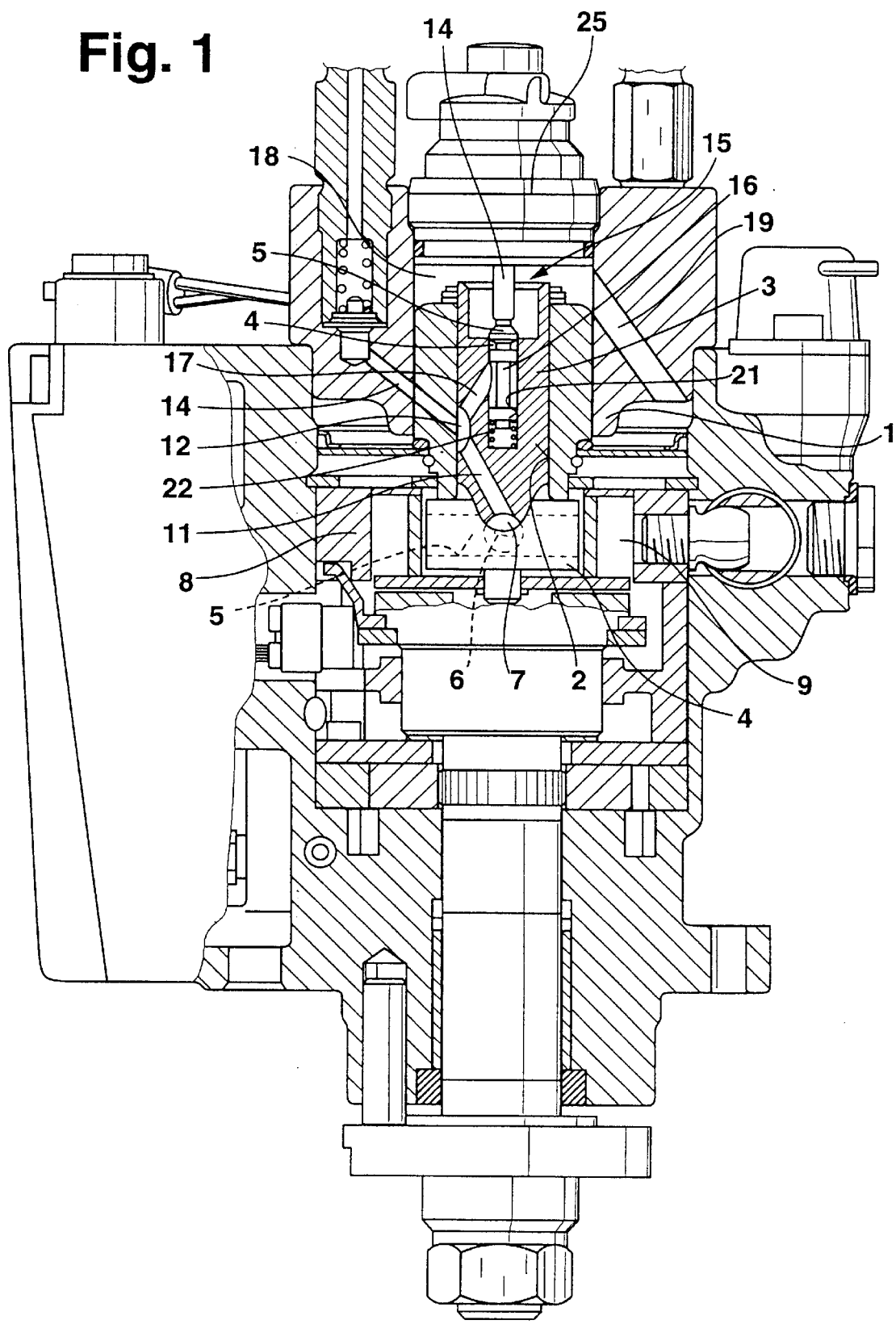
FIG. 1 shows a section through the electrically controlled valve.

The drawing shows a partial section through a fuel distributing injection pump of the radial piston pump type. A housing bore 2 in the form of a blind bore or a bore that is closed on one end is let into a housing 1 in this fuel injection pump and a part embodied in the form of a distributor 3 is movably supported in this bore, in rotary fashion in this instance. On its end protruding from the housing bore 2, the distributor 3 has a collar 4 in which cylinder bores 5 are placed, which are radial to the longitudinal axis of the distributor 3 and in which pump pistons 6 are guided, which enclose a common pump working chamber 7 in the inner part of the cylinder bores, which chamber is used as a high pressure source. The pump pistons are driven to reciprocate sliding in a sealed fashion by means of a cam means that is known per se, e.g. by means of a cam ring 8 on which rolling shoes 9 slide, which are connected to the respective pump pistons. The cam ring 8 in this instance is embodied as an essentially stationary cam ring, while the drive of the distributor is carried out via a driving axle 10, which simultaneously produces the relative motion of the rolling shoes along the cam track via the rotary motion of the distributor and is consequently used to drive the pump pistons. In the inward stroke of the pump pistons, a fuel pressure at the level of the fuel injection pressure is generated in the pump working chamber 7. The fuel is conveyed from the pump working chamber 7 via a pressure line 11 in the distributor 3 to an outlet opening in the form of a distributor opening 12 on the jacket face of the distributor. In the region of the mouth of the distributor opening 12 in the jacket face, injection lines 14 that lead from the housing bore 2 are provided in the housing 1 and each lead to a fuel injection valve, not shown in detail, in order to bring the fuel, which has been brought to high pressure, to injection in the internal combustion engine. The high fuel injection pressure is present at the distributor opening 12 per association with the respective fuel injection line 11 only as long as an electrically controlled valve, which controls the injection time and injection quantity and which is, for example, in the form of a solenoid valve 15, is closed with a valve member 16. This solenoid valve is disposed in a connecting line 17 from the distributor opening 12 to a relief chamber 18 connected to the end face of the distributor 3, which chamber is in turn relieved via a relief line 19. When the solenoid valve is open, the fuel displaced out from the pump pistons 6 is consequently returned to the relief chamber 18 in a more or less pressure-free state or one that is at least lower than the fuel injection pressure.

The valve member 16 is disposed in a blind bore 21 coaxial to the rotational axis of the distributor 3, wherein the distributor is simultaneously used as a valve housing. A restoring spring 22 in the form of a helical compression spring acts on the valve member from below and on its end that protrudes into the relief chamber, there is a tappet 24, which is coupled to the armature, not shown, of the electromagnet 25 of the solenoid valve 15. The valve member 16 has a conical sealing face 29, which cooperates with a conical valve seat 32 on the distributor 3, which valve seat 32 connects a high pressure chamber 30 on the distributor opening end to the relief chamber 18.

Figure 2:
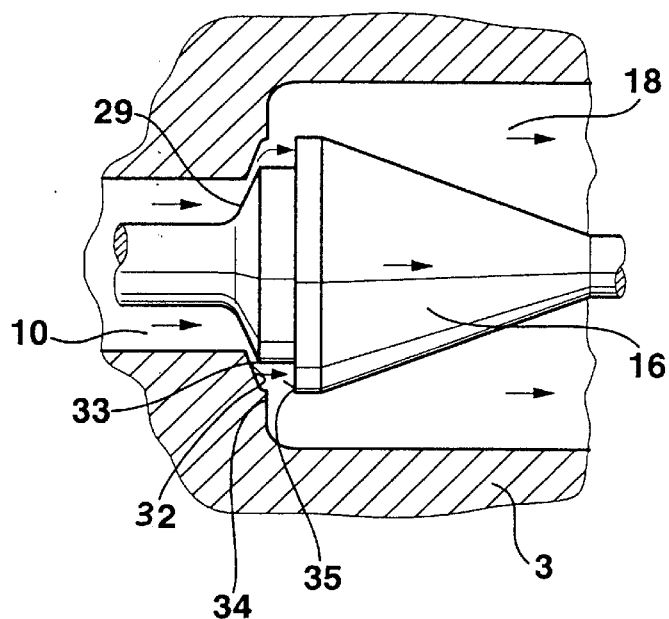
FIG. 2 shows the valve seat and valve member in an enlarged scale.

As can best be seen in the enlarged depiction according to FIG. 2, the conical sealing face 29 of the valve member 16, which sealing face 29 is placed in a sealing manner on the valve seat 32 and thus reliably seals the high pressure chamber 30 in relation to the relief chamber 18, is defined by a downstream edge 33. Downstream of the downstream edge 33 in the through flow direction, a deflection point in the form of an annular deflection wall 34 is formed onto the valve body 3 with a toroid transition at which the flow of the fuel passing through is deflected in the axial direction or in the adjusting direction of the valve body. Opposite this deflection point, downstream of the downstream edge, the valve member 16 is provided with an axially-directed annular face 35, which is defined as an engagement surface or deflector for the fuel passing through.

OPERATION OF THE VALVE

Figure 3:
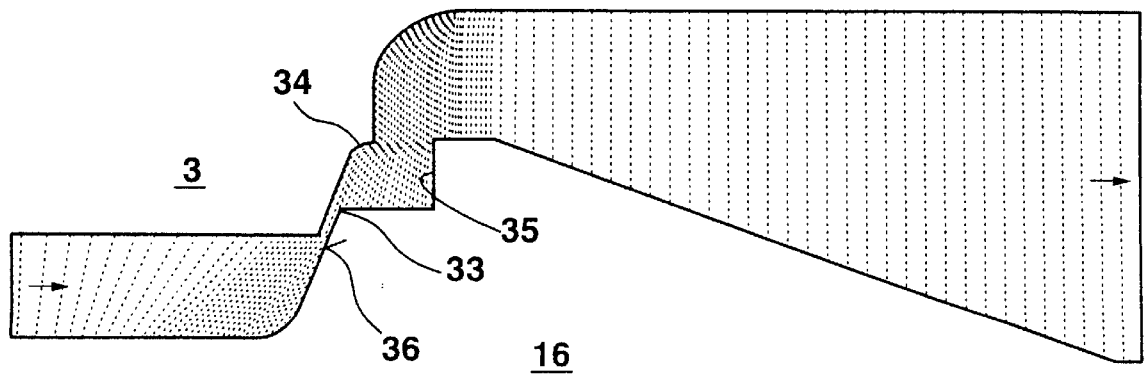
FIG. 3 is a diagram of the flow progression.

The operation of the device according to the invention will now be explained essentially in conjunction with the diagram of the flow progression according to FIG. 3. The high pressure of approximately 1000 bar prevailing in the high pressure chamber 30 rests against the valve closing member 16 from beneath when the solenoid valve is closed. In order for the solenoid valve 15 to be able to remain closed, it must be pressure balanced and only a slight opening force is permitted to be present in the closed state. The electromagnet 25 is supplied with power and holds the magnet closed.

If the magnetic force is discontinued now by switching off the electromagnet 25, the high pressure, together with the valve spring 22, lifts the valve member 16 up from its valve seat 32. Fluid under high pressure penetrates into a seat gap 35 in an essentially radial direction from the inside toward the outside with a high flow velocity and then reaches the deflection point 34 at which the fluid is deflected in an axial direction. In this through flow direction, it strikes against the annular face 35 on the valve member 16 with full ram pressure. Due to the resulting force, the valve member 16 is thrown open and opens the valve passage in a rapid, complete, and reproducible manner, and the fluid easily reaches into the low pressure chamber 18.

In this manner, an increase of needle opening force that is sought is achieved by a particular utilization of the flow energy by simple means. The solenoid valve 15 must open rapidly in order to achieve a rapid pressure drop at the end of injection in diesel injection pumps controlled by a solenoid valve. The force intensification on the valve member 5 can be arbitrarily altered by varying the size of the annular face 35 and the deflection angle at the deflection point 34. The invention can be generally used, both in distributor injection pumps such as the radial piston distributor injection pump shown above, in unit fuel injectors, line unit fuel injectors, and axial piston pumps.

The foregoing relates to preferred exemplary embodiments of the invention, it being understood that other variants and embodiments thereof are possible within the spirit and scope of the invention, the latter being defined by the appended claims.

I claim:

1. An electrically controlled valve for controlling an opening area of a connection between a high pressure chamber (10) and a low pressure chamber (18), said high pressure chamber (10), forms a pump working chamber of a fuel injection pump and is at least intermittently brought to a high fluid pressure, a valve member (16) is inserted into a blind bore (21) in a valve housing (3), said blind bore is constantly connected to the high pressure chamber (10), said valve member (16) is moved by an electromagnet (25) counter to a force of a restoring spring (22), the valve member (16) has a conical sealing face (29) that cooperates with a conical valve seat (32) on the valve housing (3), said valve seat connects the high pressure chamber (10) with the low pressure chamber (18), downstream of a downstream edge (33) on the valve member (16), which edge defines the sealing face (29) of the valve member, a deflection point (34) is provided on the valve housing (3) and configured a such that the flow of the fluid passing through the valve is deflected by said deflection point in an axial direction toward an annular face (35) on the valve member (16) and a flow force is generated that acts in the valve opening direction.

\* \* \* \* \*